United States Patent [11] 3,609,196

[72] Inventor Ross C. Terrell
Plainfield, N.J.
[21] Appl. No. 15,308
[22] Filed Mar. 2, 1970
[45] Patented Sept. 28, 1971
[73] Assignee Air Reduction Company, Incorporated
New York, N.Y.
Continuation of application Ser. No. 727,004, May 6, 1968, now abandoned.

[54] ETHER COMPOUNDS
1 Claim, No Drawings
[52] U.S. Cl. .................................................. 260/614 F,
204/158 HA, 252/171, 252/364, 424/342
[51] Int. Cl. .................................................. G07c 43/00,
G07c 43/12
[50] Field of Search ........................................ 260/614 F

[56] References Cited
UNITED STATES PATENTS

| | | | |
|---|---|---|---|
| 3,104,202 | 9/1963 | Larsen | 424/342 |
| 3,216,897 | 11/1965 | Krantz | 424/342 |
| 3,362,180 | 1/1968 | Eiseman | 62/112 |
| 2,066,905 | 1/1937 | Both | 260/614 F |
| 2,803,665 | 8/1957 | Miller et al. | 260/614 F |
| 2,803,666 | 8/1957 | Miller et al. | 260/614 F |
| 3,104,202 | 9/1963 | Larsen | 260/614 F X |
| 3,216,897 | 11/1965 | Krantz | 424/342 |
| 3,362,180 | 1/1968 | Eiseman | 260/614 F X |

OTHER REFERENCES

Park et al. I, Jour., Amer. Chem. Soc., 74, pp. 2292– 2294, 1952, 260-614 F
Park et al. II, Jour., Amer. Chem. Soc., 76 pp. 1387– 1388, 1954 260-614 F
Poznak et al., Chem. Abst., 54, 21508$^b$ 260-614 F
Gubanov et al., Zh. Obshch. Khim., 34 (8) 2802– 2803 1964 260-614F

*Primary Examiner*—Howard T. Mars
*Attorneys*—H. Hume Mathews and Edmund W. Bopp ABSTRACT: The present invention relates to the novel compounds 1,1,2,2-tetrafluoroethyl trichloromethyl ether ($CHF_2CF_2OCCl_3$); 1,1,2,2-tetrafluoroethyl dichloromethyl ether ($CHF_2CF_2OCHCl_2$); and 1,1,2,2-tetrafluoroethyl fluorochloromethyl ether ($CHF_2CF_2OCHFCl$). The compounds are prepared through selective stepwise chlorination and fluorination of 1,1,2,2-tetrafluoroethyl methyl ether. The compounds are useful as anesthetics and as solvents and dispersants of fluorinated materials.

ETHER COMPOUNDS

This application is a continuation of application, Ser. No. 727,004, filed May 6, 1968 and now abandoned.

DESCRIPTION OF THE INVENTION

This invention relates to halogenated 1,1,2,2-tetrafluoroethyl methyl ethers, their preparation, and their use in producing anesthesia in anesthetic-susceptible air-breathing mammals. The compounds of the present invention have the following generic formula:

$$CHF_2CF_2O-R$$

where R is selected from the group consisting of $-CCl_3$, $-CHCl_2$, and $-CHFcl$.

The compound 1,1,2,2-tetrafluoroethyl trichloromethyl ether has the following formula:

$$CHF_2CF_2OCcl.3$$

It is normally a clear colorless liquid with a not unpleasant odor. It has the following physical properties: b.p. 105° C. at 760 mm.; vapor pressure 37.5 mm. at 25° C.; specific gravity 1.71, and molecular weight 235.5. The compound is nonflammable, soda lime stable, and a potent anesthetic for inhalation-anesthetic-susceptible mammals.

The compound 1,1,2,2-tetrafluoroethyl dichloromethyl ether has the following formula:

$$CHF_2CF_2OCHCl_2$$

It is normally c clear colorless liquid with a pungent odor. It has the following physical properties: b.p. 85.5° C. at 760 mm.; vapor pressure 81 mm. at 25° C.; specific gravity 1.52; and a molecular weight of 201. The compound is nonflammable, soda lime stable, and is a potent anesthetic for inhalation-anesthetic-susceptible mammals.

The compound 1,1,2,2-tetrafluoroethyl fluorochloromethyl ether has the following formula:

$$CHF_2CF_2OCHFcl.$$

It is normally a clear colorless liquid with a not unpleasant odor. It has the following physical properties: b.p. 55° C. at 760 mm.; vapor pressure 251 mm. at 25° C.; specific gravity 1.52; and molecular weight 184.5. The compound is nonflammable, soda lime stable, and is a potent anesthetic for inhalation-anesthetic-susceptible mammals.

Each of the compounds, 1,1,2,2-tetrafluoroethyl trichloromethyl ether; 1,1,2,2tetrafluoroethyl dichloromethyl ether; and 1,1,2,2-tetrafluoroethyl fluorochloromethyl ether is easily miscible with other organic liquids including fats and oils and has useful solvent properties, for example as a solvent for fluorinated olefins and other fluorinated materials such as fluorowaxes. They can be used to prepare pastes and dispersions of such materials useful for coatings and the like and can be used as degreasing agents.

The compounds of the present invention can be prepared through the selective stepwise chlorination and fluorination of 1,1,2,2-tetrafluoroethyl methyl ether ($CHF_2CF_2OCH_3$), according to the following equations:

$$CHF_2CF_2OCH_3 + Cl_2 \rightarrow CHF_2CF_2OCHCl_2$$

$$CHF_2CF_2OCH_3 + Cl_2 \rightarrow CHF_2CF_2OCCl_3$$

$$CHF_2CF_2OCHCl_2 + HF + SbCl_5 \rightarrow CHF_2CF_2OCHFcl.$$

The starting material $CHF_2CF_2OCH_3$ is a well-known readily available material which is prepared by reacting methanol with tetrafluoroethylene in the presence of sodium hydroxide and α-pinene in an autoclave at 300-500 p.s.i. and 40° C.

$$CH_3OH + CF_2=CF_2 \rightarrow CHF_2CF_2OCH_3$$

The compound $CHF_2CF_2OCH_3$ is easily prepared and can be separated from the reaction mixture by fractional distillation at 36.5°–37° C. at 760 mm.

The 1,1,2,2-tetrafluoroethyl methyl ether $CHF_2CF_2OCH_3$ can be chlorinated to produce 1,1,2,2-tetrafluoroethyl dichloromethyl ether $CHF_2CF_2OCHCl_2$ and 1,1,2,2-tetrafluoroethyl trichloromethyl ether $CHF_2CF_2OCCl_3$. In the chlorination reaction the methyl group undergoes selective addition of chlorine. The preferred product can be obtained by controlling the reaction parameters and the rate of addition of chlorine. The extent of chlorination can be monitored by determining the amount of hydrogen chloride which is liberated during the reaction. The hydrogen chloride is collected in a water scrubber which is titrated with standard base to determine the amount of hydrogen chloride. In preparing $CHF_2CF_2OCHCl_2$, the chlorination should be carried out until 2 moles of hydrogen chloride are detected. In preparing $CHF_2CF_2OCCl_3$, the chlorination can be continued until 3 moles of hydrogen chloride are detected.

The chlorination of $CHF_2CF_2OCH_3$ to form $CHF_2CF_2OCCl_3$ and $CHF_2CF_2OCHCl_2$ should be carried out in either a fully or partially transparent vessel so that photoenergy can be supplied to the reaction. Suitable sources of photoenergy are incandescent, ultraviolet, and fluorescent lamps, and even strong sunlight. In view of the ready availability, low cost and ease of handling of incandescent lamps, they are preferred for use as the illumination source.

The chlorination reaction is carried out by bubbling gaseous chlorine into the liquid $CHF_2CF_2OCH_3$ while it is strongly illuminated. The chlorine is added at the same rate at which it reacts which can be determined by checking for chlorine vapor in the effluent from the chlorinator. The reaction is exothermic so cooling water should be supplied to the chlorination apparatus to control the reaction. The chlorination can be carried out at any temperature from 15° C. up to the boiling point of the chlorination mixture. Best results are usually found at 25°–35° C. where the reaction rate is fast enough and the formation of byproducts does not present a serious problem.

Following the chlorination the reaction mass can be separated by fractional distillation or by vapor phase chromatography. If distillation is employed it is recommended that the pressure be reduced in view of the high molecular weight of the product. Excessive heating should obviously be avoided in view of the possibility of decomposition of the desired product. Any lower chlorination product separated during the fractional distillation can be returned to the chlorinator for further chlorination in order to increase the yield of the desired product.

In order to prepare 1,1,2,2-tetrafluoroethyl fluorochloromethyl ether, a sample of $CHF_2CF_2OCHCl_2$ prepared according to the previously described manner should be transferred to a reaction vessel that will not be attacked during the fluorination reaction. A stainless steel copper, nickel, or platinum vessel would be quite suitable. A catalyst such as $SbCl_5$, $SnCl_4$, or $SbF_5$ should be added to the chlorinated starting material before beginning the fluorination. The fluorination reaction can be carried out by bubbling gaseous HF through the reaction mixture by adding liquid HF or by adding solid $SbF_3$ to the mixture.

The fluorination reaction is preferably carried out at 0° C. Higher or lower temperatures can be employed; however, it has been found that higher temperatures produce undesirable reaction products while lower temperatures cause a slow rate of reaction.

The effluent from the fluorination apparatus should be passed through a water scrubber to collect the HCl which is formed during the reaction. The amount of HCl formed is equivalent to the number of chlorine atoms exchanged for fluorine. Too little HCl evolved indicates incomplete exchange. Too much HCl indicates either overfluorination or decomposition. The fluorination should be continued until approximately 1 mole of HCl is collected for each mole of $CHF_2CF_2OCHCl_2$ indicating that one chlorine atom has been exchanged. The preferred site for the fluorination is on the chlorine-substituted methyl group resulting in the formation $CHF_2CF_2OCHFcl$. The desired reaction product can be readily separated from the reaction mixture by fractional distillation.

The following examples will illustrate the procedural steps leading to the preparation of 1,1,2,2-tetrafluoroethyl methyl ether, 1,1,2,2-tetrafluoroethyl dichloromethyl ether, 1,1,2,2-tetrafluoroethyl trichloromethyl ether, and 1,1,2,2-tetrafluoroethyl fluorochloromethyl ether.

EXAMPLE 1

Preparation of the Intermediate $CHF_2CF_2OCH_3$

Tetrafluoroethylene (500 g.) was added as a gas at 300–500 p.s.i. to a stirred 1-liter autoclave containing a solution of sodium hydroxide (25 g.) in methanol (300cc.) and also a small amount of α-pinene (10 g.). The autoclave was heated to 40° C. to initiate the reaction. The reaction then proceeded smoothly with a slight exotherm and was maintained at 35°–45° C. The crude product was washed with water and then fractionally distilled to 554 g. of $CHF_2CF_2OCH_3$, b.p. 36.5°–37°C. at 760 mm.

EXAMPLE 2

Preparation of $CHF_2CF_2OCHCl_2$

Approximately 200 g. (1.52 moles) of $CHF_2CF_2OCH_3$, prepared as illustrated in example 1, were added to a water-jacketed chlorinator fitted with a thermometer, a "Dry-Ice" cold-finger-type condenser and a fritted-glass gas dispersion tube. The reaction was illuminated with a 250-watt incandescent bulb and was maintained at 30° C. while chlorine gas was slowly bubbled into the solution. The course of the reaction was 1 by titration of the effluent HCl and was stopped when 1 moles of HCl per mole of starting ether had been titrated. Following the chlorination 295 g. of material were recovered.

The resulting material was flash distilled through a 60 × 1.5 cm. Vigreaux column and separated into three distinct fractions. Examination by vapor phase chromatography revealed the following compositions:

6% $CHF_2CF_2OCH_2Cl$

74% $CHF_2CF_2OCHCl_2$

20% $CHF_2CF_2OCCl_3$

Fractional distillation gave 155 g. of $CHF_2CF_2OCHcl$. 2, b.p. 84°–85 C. at 760 mm.

Calculated for $C_2H_2Cl_2F_4O$: C, 17.95; H, 0.99
Found: C, 17.9; H, 1.07

EXAMPLE 3

Preparation of $CHF_2CF_2OCCl_3$

In an apparatus similar to that employed in example % a $ClCF_{of\ CHF2}CF_2OCH_3$(155 g.) was chlorinated. The chlorination was continued until 3 moles of hydrogen chloride per mole of starting ether were detected in the water scrubber by titration with standard base. Following the chlorination 259 g. of material were recovered. Fractional distillation of the reaction mixture gave the following products:

78% $CHF_2CF_2OCCl_3$

12% $CHF_2CF_2OCHCl_2$

10% $CF_2ClCF_2OCCl_3$ × Two fractional distillations using a 60 × 1 cm. column packed with glass helices gave 152 g. of $CHF_2CF_2OCCl_3$, b.p. 103° C. at 760 mm.

Calculated for $C_3HCl_3F_4O$: C, 15.32; H, 0.47; F, 32.1
Found: C, 15.52; H, 0.47; F, 32.1

EXAMPLE 4

Preparation of $CHF_2CF_2OCHFcl$.

A 1-liter, three-necked stainless steel flask was fitted with a copper "Dry Ice" cold finger condenser, a stainless steel stirring shaft and gland, and a plastic dropping funnel. To a stirred mixture of $CHF_2CF_2OCHCl_2$ (144 g.) and $SbCl_5$ (15 g.) there was added hydrogen fluoride (22 cc.). When the evolution of HCl stopped, the reaction mixture was poured into water and the crude product (123 g.) was recovered. Fractional distillation of the product gave 80 g. of $CHF_2CF_2O CHFcl$. b.p. 54.5°–55° C. at 760 mm.

Calculated for $C_3H_2ClF_5O$: C, 19.50; H, 1.08
Found: C, 19.26; H, 1.17

In order to determine the potency of 1,1,2,2-tetrafluoroethyl dichloromethyl ether; 1,1,2,2-tetrafluoroethyl trichloromethyl ether; and 1,1,2,2-tetrafluoroethyl fluorochloromethyl ether as inhalation anesthetics in respirable mixtures containing a life-supporting amount of oxygen, a series of tests were carried out employing mice. Each of the compounds tested was at least 99.5 percent pure as determined by vapor phase chromatography.

PHARMACOLOGICAL TESTING OR SCREENING OF $CHF_2CF_2OCHCl_2$

Groups of five mice were placed in a jar and exposed to a concentration of 0.75 percent by volume of 1,1,2,2-tetrafluoroethyl dichloromethyl ether. After an induction time of 6.3 min. the mice were lightly anesthetized. During the anesthesia the mice showed good oxygenation and abdominal respiration. The mice recovered in 1.2 min., following removal from the jar, and showed no aftereffects.

Groups of five more mice were then given a similar test with 1.25 percent by volume of the compound. After an induction time of 1.4 min., which was free of excitation, the mice were in a deep plane of anesthesia. During the period of anesthesia the mice showed good color and abdominal respiration. The mice recovered in 5.2 min. following removal from the jar.

Groups of five more mice were again tested employing a similar technique with 2.5 percent by volume of the compound. After an induction time of 0.5 min. the mice were in a very deep plane of anesthesia. The mice were removed from the jar and recovered in 22.6 min. There were no delayed deaths following the very deep anesthesia. The compound appears to be very potent anesthetic for anesthetic-susceptible mammals.

PHARMACOLOGICAL TESTING OR SCREENING OF $CHF_2CF_2OCCl_3$

Groups of five mice were placed in a jar and exposed to a concentration of 1.25 percent by volume of 1,1,2,2-tetrafluoroethyl trichloromethyl ether. After an induction time of 2.85 min. the mice appeared to be in a good plane of anesthesia, with satisfactory color and respiration. During the period of anesthesia the mice showed no visible untoward effects. The mice recovered in 2.6 min. following removal from the jar, and exhibited no aftereffects.

Groups of five more mice were then given a similar test with 2.5 percent by volume of the compound. After an induction time of 1.25 min. an excellent anesthetic syndrome was produced. Anesthesia was deep and the mice exhibited good oxygenation. Upon removal from the jar the mice fully recovered in 6.6 min. with no delayed deaths.

PHARMACOLOGICAL TESTING AND SCREENING OF $CHF_2CF_2OCHFcl$.

Groups of five mice were placed in a jar and exposed to a concentration of 2.5 percent by volume of 1,1,2,2-tetrafluoroethyl fluorochloromethyl ether. After an induction time of 1.2 min. an excellent anesthetic syndrome was produced. The mice exhibited good abdominal breathing an oxygenation with no twitching or movements. The mice recovered in 0.5 min. following removal from the jar, with no aftereffects.

Groups of five more mice were then given a similar test with 5 percent by volume of the compound. After an induction time of 0.25 min. an excellent deep anesthetic syndrome was produced. During the period of anesthesia the mice exhibited good color and no twitching or movements. Upon removal from the jar the mice fully recovered in 2.4 min. with no delayed deaths. 1,1,2,2The compounds 1,1,2,2-tetrafluoroethyl dichloromethyl ether; 1,1,2,2-tetrafluoroethyl trichloromethyl ether; and 1,1,2,2,-tetrafluoroethyl fluorochloromethyl ether all appear to exhibit excellent anesthetic properties in inhalation-anesthetic-susceptible mammals. The compounds are nonflammable and soda lime stable, and lend themselves well to effective use as inhalant anesthetics in respirable mixtures containing life-supporting concentrations of oxygen.

The effective amounts of each of the compounds to be employed depends upon the level of anesthesia to which the mammal is to be brought, the rate at which anesthesia is to be induced, and the length of time over which anesthesia is to be maintained. Volume percentages of the compounds in respirable mixtures containing life-supporting amounts of oxygen from a fraction of a percent up to several percent can be employed. The person controlling the anesthesia can easily regulate the amount of the ether to be used, starting with a small amount and gradually increasing the amount until the desired plane of anesthesia is reached. By then monitoring the physical properties of the mammal, as is the usual procedure, the duration and plane of anesthesia can be readily controlled.

It should be understood that the foregoing disclosure relates only to a preferred embodiment of the invention and that it is intended to cover all changes and modifications of the example of the invention herein chosen for the purpose of the disclosure which does not constitute departure from the spirit and scope of the invention.

I claim:
1. A compound of the formula

$$CHF_2CF_2O-R$$

wherein R is selected from the group consisting of $-CCl_3$, $-CHCl_2$, and $-CHFcl$.

UNITED STATES PATENT OFFICE
CERTIFICATE OF CORRECTION

Patent No. 3,609,196          Dated September 28, 1971

Inventor(s) Ross C. Terrell

It is certified that error appears in the above-identified patent and that said Letters Patent are hereby corrected as shown below:

Col. 1, line 15, "CHFcl" should read -- CHFCl --;
      line 18, in the formula "$CHF_2CF_2OCcl.3$" should read -- $CHF_2CF_2OCCl_3$ --;
      line 31, "c" should read -- a -- ;
      line 40, in the formula "c" should read -- C --;
      line 65, in the formula "c" should read -- C --;

Col. 3, line 1, in the formula "c" should read -- C --;
      line 35, "1" should be deleted;
      line 36, "1" should read -- 2 --;
      line 50, in the formula "$CHF_2CF_2OCHcl.2$" should read -- $CHF_2CF_2OCHCl_2$ --;
      line 53, "17.9" should read -- 17.92 --;
      line 59, "%" should read -- 2 --;
      line 60, "$ClCF_{of\ CHF2}$" should be deleted and -- sample of $CHF_2$ -- should be inserted;
      line 70, "X" should be deleted.

Col. 4, line 3, in the formula "c" should read -- C --;
      line 13, "CHFcl" should read -- CHFCl --;
      line 34, "aftereffects" should be two words;
      line 61, "aftereffects" should be two words';
      line 70, in the formula "c" should read -- C --.

Col. 5, line 4, "aftereffects" should be two words;
      line 11, "1,1,2,2" (first occurence) should be deleted.

Col. 6, line 21, "CHFcl" should read -- CHFCl --.

Signed and sealed this 9th day of May 1972.

(SEAL)
Attest:

EDWARD M. FLETCHER, JR.
Attesting Officer

ROBERT GOTTSCHALK
Commissioner of Patents